(12) United States Patent
Hinton et al.

(10) Patent No.: US 11,795,683 B2
(45) Date of Patent: Oct. 24, 2023

(54) DROP-IN CEILING WALL SYSTEM (71) Applicant: Falkbuilt Ltd., Calgary (CA)

(72) Inventors: Thom Hinton, Calgary (CA); Imre Ordog, Calgary (CA); Clayton Smed, Rural Rocky View County (CA)

(73) Assignee: Falkbuilt Ltd., Calgary (CA)

( * ) Notice: Subject to any disclaimer, the term of this patent is extended or adjusted under 35 U.S.C. 154(b) by 175 days.

(21) Appl. No.: 17/498,956

(22) Filed: Oct. 12, 2021

(65) Prior Publication Data

US 2023/0111235 A1   Apr. 13, 2023

(51) Int. Cl.
| | |
|---|---|
| E04B 1/38 | (2006.01) |
| E04C 3/30 | (2006.01) |
| F16L 5/00 | (2006.01) |
| F16B 7/22 | (2006.01) |
| E04B 2/58 | (2006.01) |
| E04B 9/30 | (2006.01) |

(52) U.S. Cl.
CPC ............. *E04B 1/388* (2023.08); *E04B 2/58* (2013.01); *E04B 9/30* (2013.01); *E04C 3/30* (2013.01); *F16B 7/22* (2013.01); *F16L 5/00* (2013.01); *E04B 2001/389* (2023.08)

(58) Field of Classification Search
None
See application file for complete search history.

(56) References Cited

U.S. PATENT DOCUMENTS

| | | | | |
|---|---|---|---|---|
| 2,101,952 | A | * | 12/1937 | Anders ............... E04B 2/78 52/471 |
| 3,323,262 | A | * | 6/1967 | Cesare, Jr. ......... E04B 2/7854 52/656.1 |
| 4,193,233 | A | | 3/1980 | Vandenhoek |

(Continued)

FOREIGN PATENT DOCUMENTS

| | | |
|---|---|---|
| CA | 3076354 A1 | 3/2020 |
| JP | 01058767 A * | 3/1989 |

(Continued)

OTHER PUBLICATIONS

Murray, Tara; "Solid Wall Patent Background"; Haworth; Mar. 13, 2020; 7 pages.

(Continued)

*Primary Examiner* — Joshua K Ihezie
(74) *Attorney, Agent, or Firm* — Steven L. Nichols; Fabian VanCott (57) ABSTRACT

A system and method for building a solid wall with a drop-in ceiling includes a floor track to be secured on a base floor. A support structure of studs is to be secured to the floor track. Cornice rails are to be placed on top of the studs. Splice plates are to connect ends of the cornice rails together. A top cladding is to be installed to at least a portion of the studs at a fixed distance below the top of the studs. The top cladding is to be installed prior to the cornice rails being secured to the top of the studs. Ceiling mounts are to be installed on top of the cladding in a manner that provides equal spacing reveals between the ceiling mounts and the (Continued)

cladding. Splice plates are to connect ends of the ceiling mounts together. A secondary cladding is to be installed to the studs. To complete the wall system, a drop-in ceiling is secured on top of the ceiling mounts.

18 Claims, 14 Drawing Sheets (56) References Cited

U.S. PATENT DOCUMENTS

| | | | |
|---|---|---|---|
| 4,899,509 A * | 2/1990 | Power | E04B 2/825 |
| | | | 52/717.06 |
| 4,910,938 A * | 3/1990 | McGee | E04H 1/1205 |
| | | | 52/656.1 |
| 4,986,047 A * | 1/1991 | Power | E04B 2/825 |
| | | | 52/241 |
| 5,157,884 A * | 10/1992 | Schwartz | E04B 9/30 |
| | | | 52/506.06 |
| 5,279,088 A * | 1/1994 | Heydon | E04H 3/02 |
| | | | 52/223.6 |
| 5,377,466 A | 1/1995 | Insalaco | |
| 5,606,836 A | 3/1997 | Insalaco | |
| 5,619,833 A * | 4/1997 | Neff | E04B 9/30 |
| | | | 52/506.07 |
| 5,685,662 A | 11/1997 | Rollin | |
| 5,839,240 A | 11/1998 | Elsholz | |
| 5,992,109 A * | 11/1999 | Jonker | E04B 2/821 |
| | | | 52/586.1 |
| 6,003,273 A * | 12/1999 | Elsholz | E04C 2/521 |
| | | | 174/72 A |
| 6,109,461 A | 8/2000 | Kluge | |
| 6,112,485 A | 9/2000 | Beyer | |
| 6,213,679 B1 | 4/2001 | Frobosilo | |
| 6,349,516 B1 | 2/2002 | Powell | |
| 6,481,177 B1 | 11/2002 | Wood | |
| 6,711,871 B2 | 3/2004 | Beirise | |
| 6,889,477 B1 | 5/2005 | Kottman | |
| 7,694,483 B1 * | 4/2010 | Tucker | E04B 1/28 |
| | | | 52/92.2 |
| 8,015,767 B2 | 9/2011 | Glick | |
| 8,695,310 B2 * | 4/2014 | Tremblay | E04C 3/292 |
| | | | 52/775 |
| 9,255,403 B1 | 2/2016 | Lehane | |
| 9,963,869 B1 | 5/2018 | Mironchuk | |
| 10,041,288 B1 * | 8/2018 | Flood | E04B 2/58 |
| 10,323,412 B2 | 6/2019 | Koziol | |
| 10,738,466 B1 * | 8/2020 | Boyce | E04B 2/7433 |
| 11,142,901 B2 | 10/2021 | Friedlos | |
| 2001/0039774 A1 | 11/2001 | Beirise | |
| 2002/0062617 A1 | 5/2002 | Digirolamo | |
| 2002/0157335 A1 | 10/2002 | Vos | |
| 2003/0089057 A1 * | 5/2003 | Wiechecki | E04B 2/745 |
| | | | 52/238.1 |
| 2004/0231271 A1 * | 11/2004 | Bruno | E04B 9/22 |
| | | | 52/506.01 |
| 2005/0034408 A1 * | 2/2005 | Palumbo | E04B 2/7457 |
| | | | 52/633 |
| 2005/0247654 A1 | 11/2005 | Walker | |
| 2006/0016139 A1 * | 1/2006 | Beck | E04B 9/30 |
| | | | 52/289 |
| 2006/0236625 A1 * | 10/2006 | MacDonald | E04B 2/7425 |
| | | | 52/239 |
| 2008/0060288 A1 * | 3/2008 | Frobosilo | E04B 2/58 |
| | | | 52/204.1 |
| 2008/0104922 A1 | 5/2008 | Glick | |
| 2009/0013639 A1 | 1/2009 | Tremblay | |
| 2009/0193735 A1 | 8/2009 | Kalinowski | |
| 2010/0006518 A1 | 1/2010 | Brobst | |
| 2013/0091691 A1 | 4/2013 | Oetlinger | |
| 2014/0331564 A1 | 11/2014 | Wei | |
| 2016/0069072 A1 | 3/2016 | Rice | |
| 2016/0168863 A1 | 6/2016 | Kwan | |
| 2016/0273214 A1 * | 9/2016 | Kopish | E04B 2/827 |
| 2017/0204600 A1 | 7/2017 | Daudet | |
| 2018/0094422 A1 | 4/2018 | Getz | |
| 2018/0094431 A1 | 4/2018 | Koziol | |
| 2019/0071869 A1 * | 3/2019 | Maley | E04F 19/061 |
| 2019/0249418 A1 | 8/2019 | Chapman | |
| 2019/0380492 A1 | 12/2019 | Heap | |
| 2020/0318339 A1 * | 10/2020 | Friedlos | E04B 2/7437 |
| 2021/0079648 A1 | 3/2021 | Viebahn | |
| 2021/0180315 A1 | 6/2021 | Marshall | |

FOREIGN PATENT DOCUMENTS

| | | |
|---|---|---|
| WO | 2012039678 | 3/2012 |
| WO | 2017069698 | 4/2017 |

OTHER PUBLICATIONS

Author unknown; Teknion Leveler Foot Image; 1 page; Retrieved from online search in Apr. 2019.
Slotted Standard Hooks Image; Retrieved from internet search Jun. 2019; 1 page.
Racking Images; Retrieved from internet search Apr. 2019; 1 page.
https://www.bmp-group.com/; viewed website on Feb. 3, 2022; 3 pages.
https://www.clarkdietrich.com/; viewed website on Feb. 3, 2022; 3 pages.

* cited by examiner

DROP-IN CEILING WALL SYSTEM

BACKGROUND

Wall systems with digitally designed components provide innovative solutions over drywall installation by providing manufactured wall components to be used for quick and efficient onsite installation.

DETAILED DESCRIPTION

Construction projects may involve the purchase and delivery to a job site of 30% more materials than what is needed. These projects rely on materials/tools such as screw guns, time, garbage bins, and a laborer to fill the garbage bins with waste created from the construction. When the project is completed, the bin is hauled to a dump.

In another example referred to as modular construction, everything is built in a factory, loaded in trucks, and then taken to a jobsite. After the walls or room modules are unloaded, the modules are placed side-by-side in precisely designated locations and orientations. Each module is then individually leveled and attached to adjacent modules.

The present specification describes a construction method that combines aesthetics with high-performing and cost-effective environments. Work spaces, classroom settings, and hospital rooms are just a few examples of environments in which these construction methods may be used.

The present specification describes digital component construction. Using digital technology, individual components are precisely manufactured and then delivered and installed. There is no need, however, for clean up or waste removal. The cost remains competitive with other types of construction.

As part of a digital component construction, a wall system is assembled using various components and methodology that will be described herein.

An example method for building a drop-in ceiling wall system includes the installation of a floor track. This is followed by a support structure of studs being installed along the floor track. Cornice rails are installed to the studs. Also, a top cladding is installed to at least a portion of the studs. Ceiling mounts are secured to tops of the studs. This is followed by a secondary cladding installed to the studs. To complete the wall system, a drop-in ceiling is secured on top of the ceiling mounts.

An example system for building a drop-in ceiling wall system includes a floor track and a support structure of studs along the floor track. Ceiling mounts are to be secured on tops of the studs. A drop-in ceiling is to be lowered and secured on top of the ceiling mounts. Cornice rails are to be installed on the studs. A top cladding is to be installed on at least a portion of the studs. A secondary cladding is to be installed on the studs.

An example system for building a drop-in ceiling wall system includes a floor track to be secured on a base floor. A support structure of studs is secured to the floor track. Cornice rails are placed on top of the studs. Splice plates connect ends of the cornice rails together. A top cladding is installed to at least a portion of the studs at a fixed distance below the top of the studs. The top cladding is installed prior to the cornice rails being secured to the top of the studs. Ceiling mounts are installed on top of the top cladding in a manner that provides equal spacing reveals between the ceiling mounts and the top cladding. Splice plates connect ends of the ceiling mounts together. A secondary cladding is installed to the studs. To complete the wall system, a drop-in ceiling is secured on top of the ceiling mounts.

Figure 1:
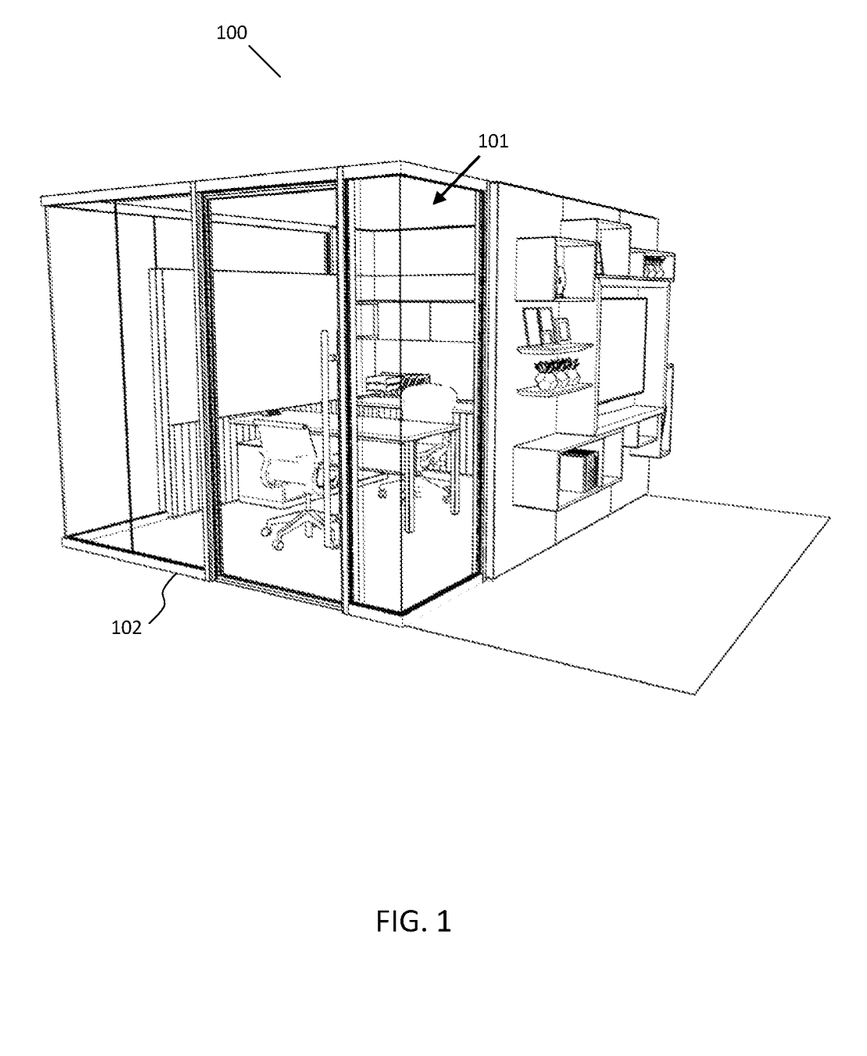
FIG. 1 illustrates a perspective view of a wall system according to an example of the principles described herein.

Turning to FIG. 1, a completed example workspace 101 with a wall system 100 is illustrated according to example of principles described herein. The wall system 100 includes walls that attach to the floor. A drop-in ceiling finishes off the enclosed environment to provide a private, fully-functioning workspace 101. The workspace 101 shown includes office furniture, equipment, and décor, similar to what is found in standard workspaces.

The walls, or cladding may be pre-formed or cut to desired sizes on site during construction. The cladding are then connected using various stud assemblies and components that allow for adjustments, replacements, and overall modularity of the wall system 100.

Figure 2:
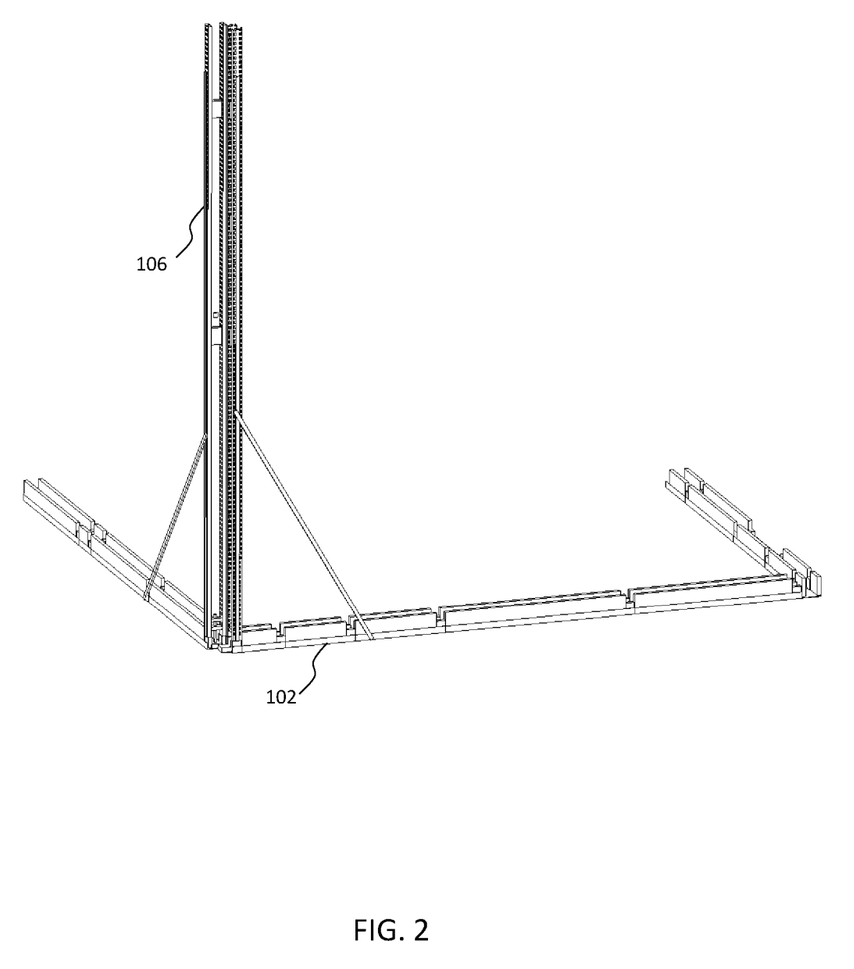
FIG. 2 illustrates a perspective view of a stud secured to a floor track according to an example of the principles described herein.

FIG. 2 illustrates the beginning steps of construction of a wall system 100. First, a floor track 102 is secured to a floor. The floor track 102 is a generally flat elongate member that is to lay flush with a base floor underneath. The floor track 102 may include upturned sides, such as perpendicular sidewalls that support cladding and studs that are attached to, or placed on, the floor track 102.

For installation, the floor track 102 may be cut to a desired length. In an example, the floor track 102 includes a set of holes therethrough. Relatively small holes are used for fasteners to fasten the floor track to a ground surface. The floor track 102 may further include holes (not shown) that allow for ease of electrical and mechanical wires to pass through. The holes further provide a visual cue to an installer to align with centerline markings, such as chalk lines, for layout purposes. The holes may be equally spaced apart or otherwise spaced in a manner that allows for precision.

A wall system 100 may also be added to an existing building by abutting a floor track 102 against a base building wall. In this position, the floor track 102 is secured with anchors to the base floor (not shown).

Once the floor track 102 is secured to the base floor, whether alone on the base floor, or up against a base building wall, the support structure may be installed. Installation begins at a corner connection of the floor track 102, such as a 90 degree angle connection or other angle connection. At least one stud 106 is secured at the corner connection. This is shown in FIG. 2, with a stud 106 secured at the corner connection of the floor track 102.

Figure 3:
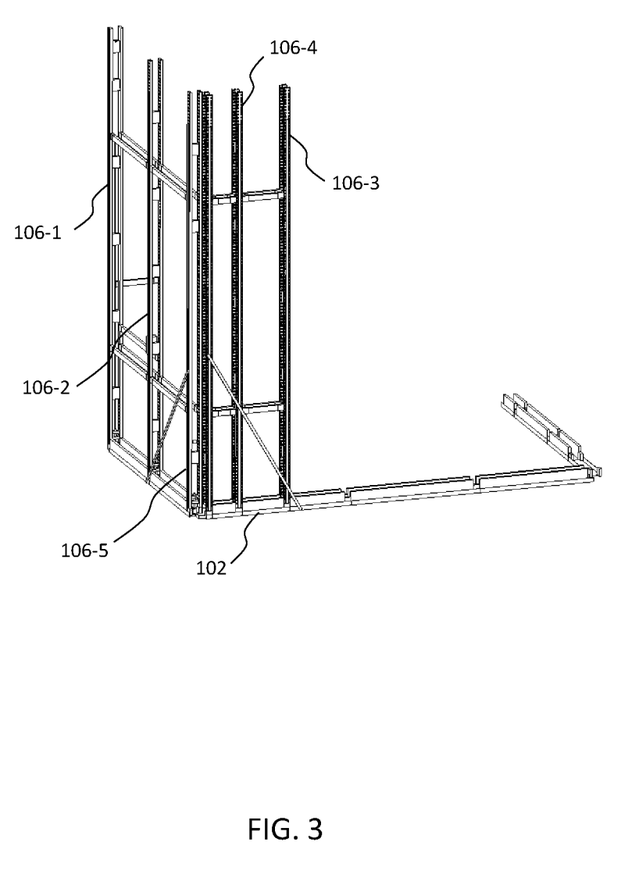
FIG. 3 illustrates a perspective view of a support structure of studs secured to a floor track according to an example of the principles described herein.

Following the stud 106 at the corner connection, adjacent studs to the stud 106 are continually installed to define a skeletal frame wall around the floor track 102. In FIG. 3, adjacent studs 106-1, -2, -3, -4 are installed next to the stud 106-5 at the corner connection to start the process of building the skeletal frame wall. Studs 106-1, -2, -3, -4, -5 are installed on the floor track 102 in a precise manner. To accomplish a precise arrangement, digital horizontals (not shown) may be inserted between adjacent studs to space the studs at desired positions around the floor track 102. Base foam blocks (not shown) are used as sound barriers between two sides of the wall.

Once the studs 106-1, -2, -3, -4, -5 are positioned as desired, the studs 106-1, -2, -3, -4, -5 are leveled to a benchmark height above the floor track. The base floor may have a high spot. Beginning at the high spot, the nearest stud is leveled to a benchmark height above the base floor. In an example, the height from the bottom of the stud to the base floor may be approximately 5½". The height may be less than 5½" or greater than 5½". The benchmark height will serve as a reference level for the remaining studs as they are leveled. If the highest stud was 106-1, then it would serve as the benchmark height for the remaining studs 106-2, -3, -4, -5. The benchmark height may also be referenced with respect to the floor track 102.

Figure 4:
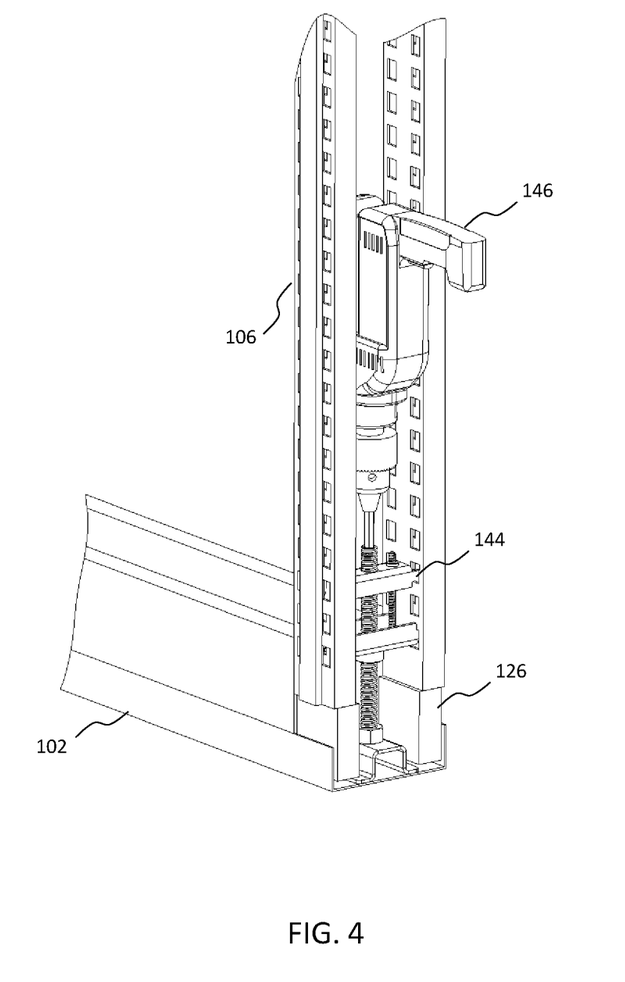
FIG. 4 illustrates a perspective view of a stud being leveled according to an example of the principles described herein.

FIG. 4 illustrates a stud 106 being leveled to a benchmark height. A spacer block 126 is inserted underneath the stud 106 to raise the stud 106 to a desired height. The spacer block 126 further includes acoustic material which provides acoustic control underneath the stud 106.

A threaded leveler 144 may be inserted between the stud 106 and spacer block 126 for incremental adjustment in height. A drill 146 is used to secure the threaded leveler 144 to the floor track 102 with the stud 126 at a height above the floor track 102.

Figure 5:
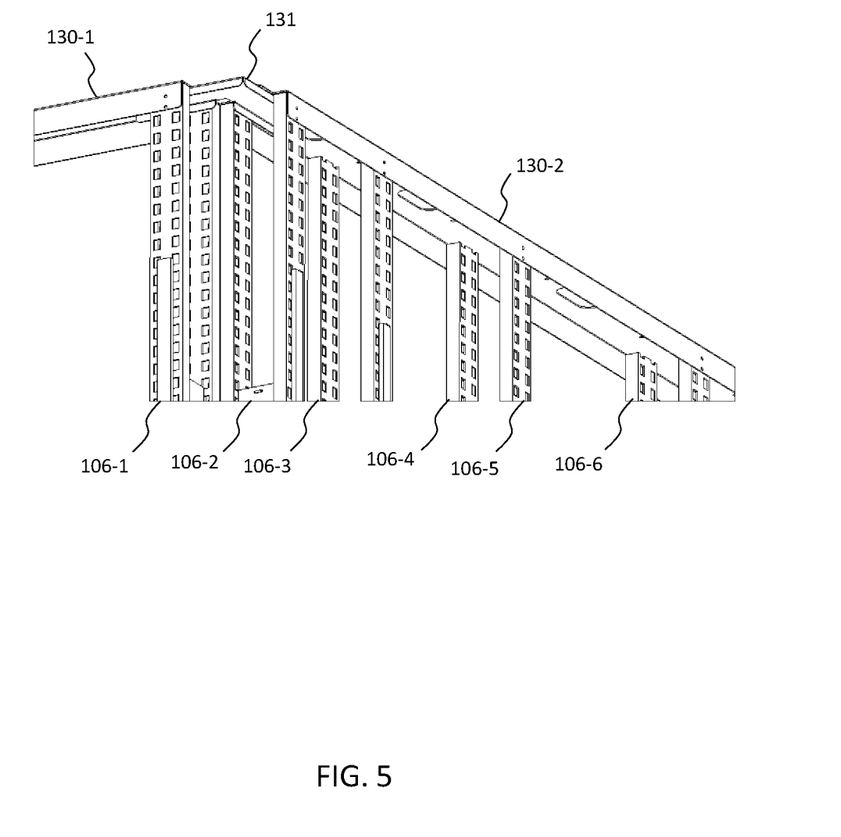
FIG. 5 illustrates a perspective view a corner splice plate attached to end portions of cornice rails according to an example of the principles described herein.

Turning to FIG. 5, cornice rails 130-1, -2 are placed on top of the studs 106-1, -2, -3, -4, -5, -6 and considered to be structural supports to secure the studs 106-1, -2, -3, -4, -5, -6 and maintain vertical alignment and positioning relative to their respective floor tracks. The cornice rails 130-1, -2 include elongate members with sidewalls on either side to form a straight-edged "C" shape. The cornice rails 130-1, -2 are the same or substantially similar to the shape and dimensions of the floor track 102 (see FIG. 3). In an example, the cornice rails 130-1, -2 and floor tracks 102 may have a specific design and length to be put in a specific location. In another example, the cornice rails 130-1, -2 and floor tracks 102 have generic lengths and are cut to size on the job site. In another example, the cornice rails 130-1, -2 have a specific design and length while the floor track 102 comes in a generic size and is cut to size. The cornice rails 130-1, -2 may be used for free standing applications in which the completed wall system 100 stands independent and separate from any other structures. The materials of the floor track 102 and cornice rails 130-1, -2 may be the same or different. Example materials for the cornice rails 130-1, -2, floor track 102, as well as other components described herein include steel, aluminum, or a combination thereof.

Cornice rails 130-1, -2 are used for "free standing" applications, or in other words, to be used with studs that are not abutting a building wall or other structure. They are also used in situations where additional structural support is needed. The cornice rails 130-1, -2 placed on top of the studs 106-1, -2, -3, -4, -5, -6 provide stability. As shown in FIG. 5, cornice rails 130-1, -2 are placed on top of studs 106-1, -2, -3, -4, -5, -6. As shown in FIG. 5, a corner splice plate 131 secures cornice rails 130-1, -2, which meet at a 90-degree angle. The corner splice plate 131 includes a generally flat member that is bent at a 90-degree angle to provide two elongate extensions that can be secured underneath the two cornice rails 130-1, -2 that meet at the corner angle. In other examples, the corner splice plate 131 includes a bend that is less than or greater than a 90-degree angle. Further examples include corner splice plates 131 that are curved or otherwise rounded.

Figure 6:
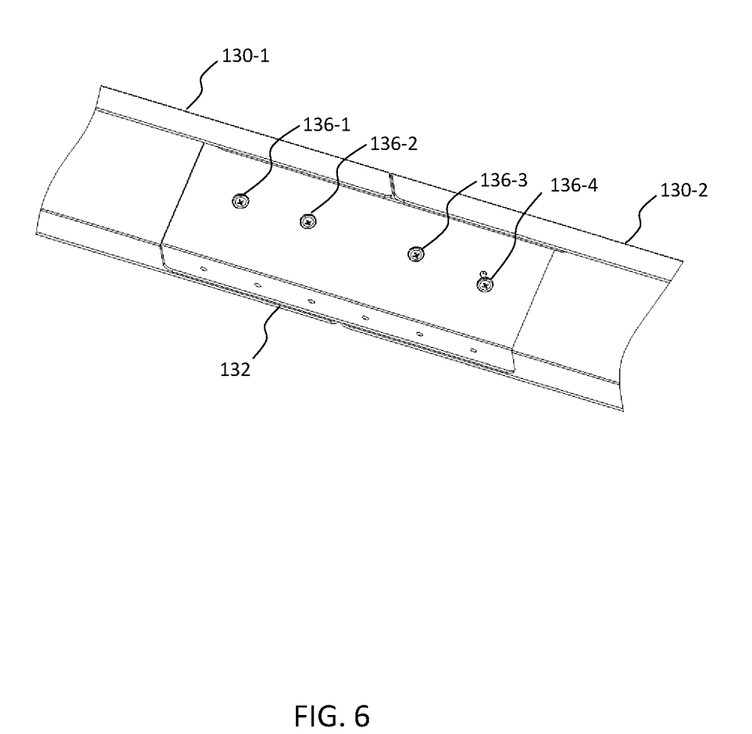
FIG. 6 illustrates a perspective view of a splice plate attached to end portions of cornice rails according to an example of the principles described herein.

In addition to a corner splice plate 131, securement of cornice rails 130-1, -2 may be accomplished with a straight splice plate 132 or a T-shaped splice plate. A straight splice plate 132 is an elongate, generally flat member with side walls as shown in FIG. 6. A T-shaped splice plate, not shown, includes a splice plate that is T-shaped to fit underneath cornice rails that converge at a T-shape.

The splice plates 131 and 132 may include holes for being secured with wafer screws to the cornice rails. As shown in FIG. 6, a row of holes 136-1, -2, -3, -4 that are centrally located and spaced apart along the length of the splice plate 132 receive wafer screws therethrough to secure the splice plate 132 to end portions of cornice rails 130-1, -2.

Figure 7:
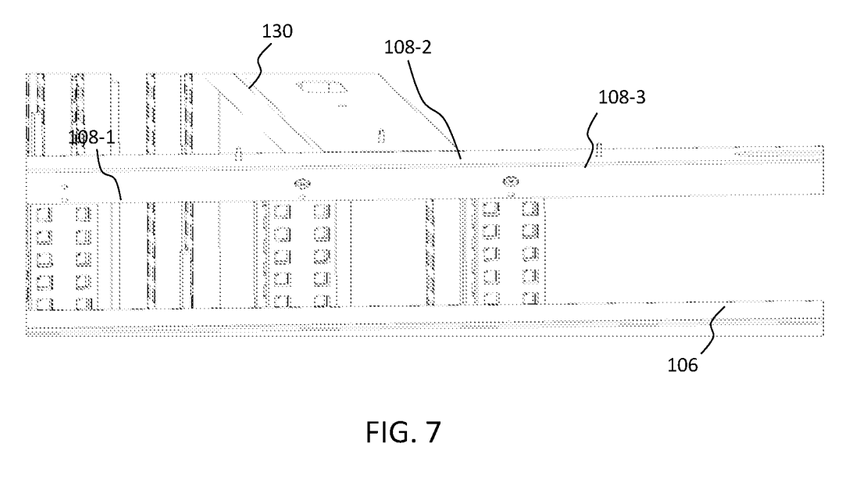
FIG. 7 illustrates a top row of cladding attached to studs according to an example of the principles described herein.

Once the cornice rails 130-1, -2 are secured by the splice plate 132, a top cladding 108-1, -2, -3 is installed, as shown in FIG. 7. The top cladding 108-1, -2, -3 includes flat panels that are used as modular wall forms. The top cladding 108-1, -2, -3 and the cornice rails 130-1, -2 (see FIG. 6) may be attached with wafer head screws to studs 106. The various studs are referenced collectively as 106. As shown in FIG.

7, various top cladding are referenced as top cladding 108-1, -2, -3 and are installed around a portion of the wall structure. The top cladding 108-1, -2, -3 are attached to the studs 106 to form a horizontal top row of panels around the wall structure. The horizontal top row of panels are offset from the ceiling height. In an example, the top row of panels is offset by 2 mm, 3 mm, 4 mm, 5 mm, 6 mm, 7 mm or any distance in between 2 mm to 7 mm. In an example, the studs 106 protrude 4 inches, 5 inches, 6 inches, 7 inches, 8 inches, or any distance between 4 inches and 8 inches. The offset distance of the cornice rails aids in "squaring up" the studs, or in other words, providing support for the structure of the studs, prior to fastening the top cladding.

Figure 8:
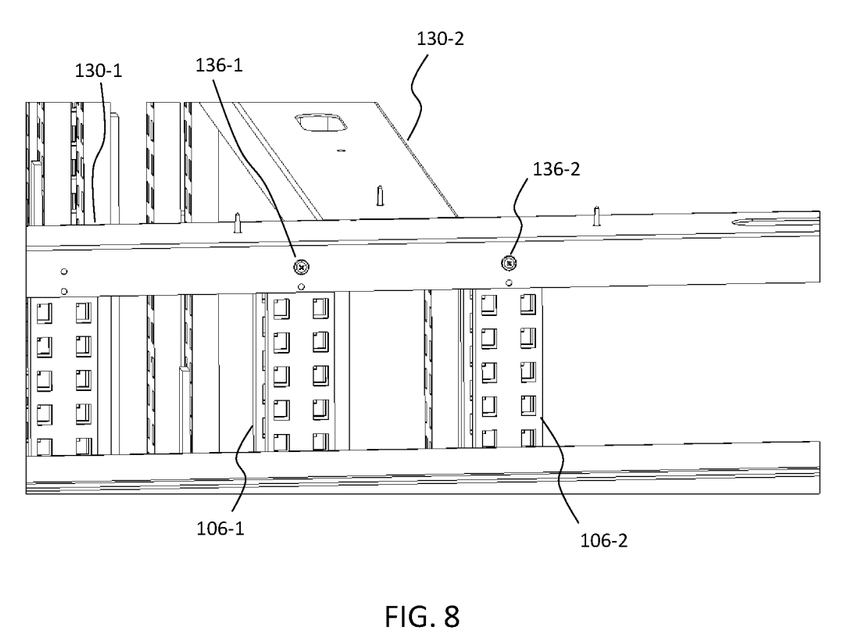
FIG. 8 illustrates cornice rails attached on top of a stud assembly according to an example of the principles described herein.

After the top cladding 108-1, -2, -3 are installed, the cornice rails 130-1, -2 are attached to the studs 106-1, -2 as illustrated in FIG. 8. Securement may be accomplished with wafer head screws 136-1, -2 screwed through holes in the cornice rails 130-1, -2 to the studs 106-1, -2.

In another example, the top cladding 108-1, -2, -3 (FIG. 7) is installed prior to the cornice rails 130-1, -2. In this manner, the top cladding 108-1, -2, -3 aids in "squaring up," or otherwise aligning the studs 106 in position relative to each other and the floor track 102, prior to fastening the cornice rails 130-1, -2.

Figure 9:
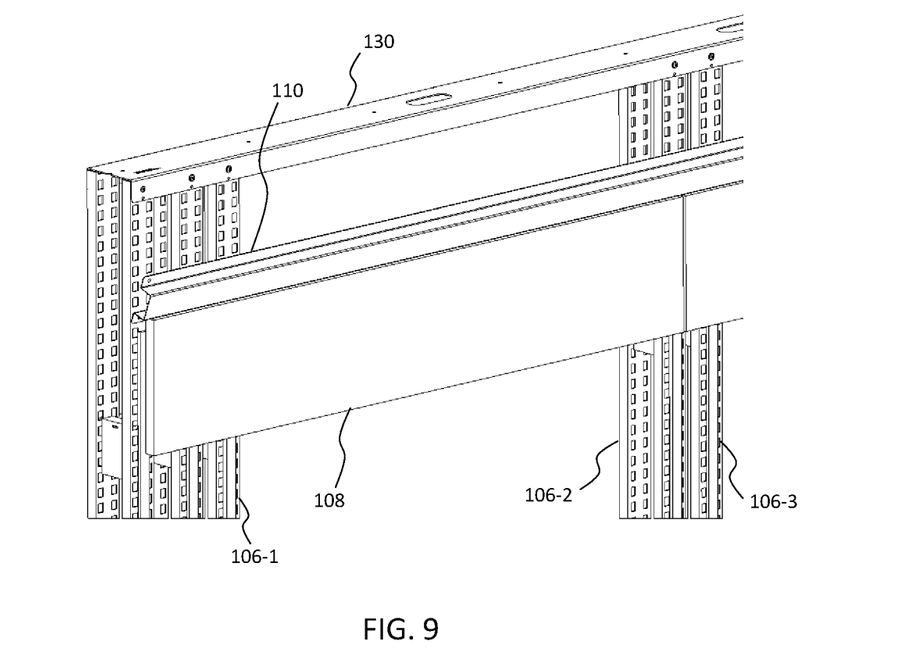
FIG. 9 illustrates a ceiling mount being attached on top of a top row of cladding according to an example of the principles described herein.

Turning to FIG. 9, with the top cladding 108 installed, a ceiling mount 110 is then installed on top of the top cladding 108. A ceiling mount 110 includes an elongate member having a hat-shaped cross-section in which a central portion extends upward in a box-like shape and side portions extend perpendicularly outward from ends of the box-like shape, forming a hat shape. The hat-shaped cross-section and box-like shape can be seen in FIG. 14 (108-1, -2).

Figure 10:
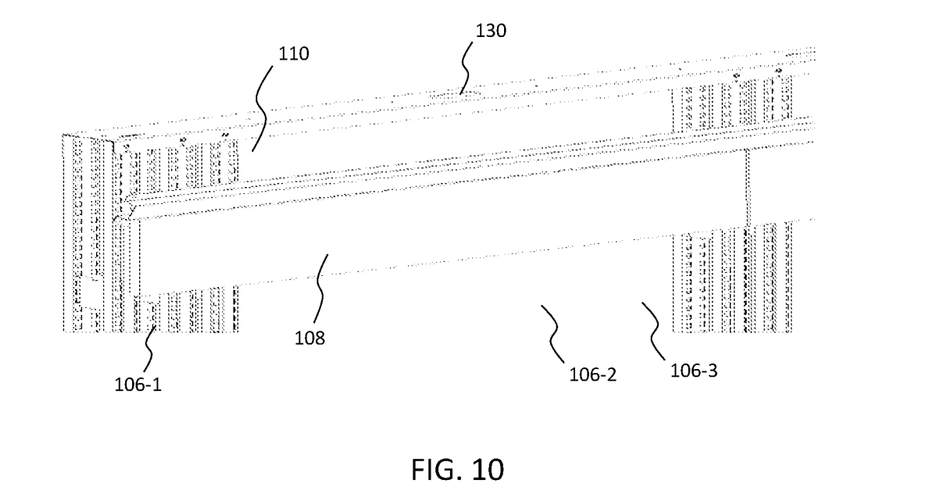
FIG. 10 illustrates a ceiling mount incorporated on top of a top row of cladding according to an example of the principles described herein.

To install the ceiling mount 108, a first side portion of the ceiling mount 110 is tilted to lay behind a top edge of the top cladding. As shown in FIG. 9, first side portion of the hat shape of the ceiling mount 110 is inserted behind the top edge of top cladding 108. Then, the ceiling mount 110 is straightened vertically upward, or in parallel with, the studs 106-1, -2, -3, as shown in FIG. 10.

Figure 11:
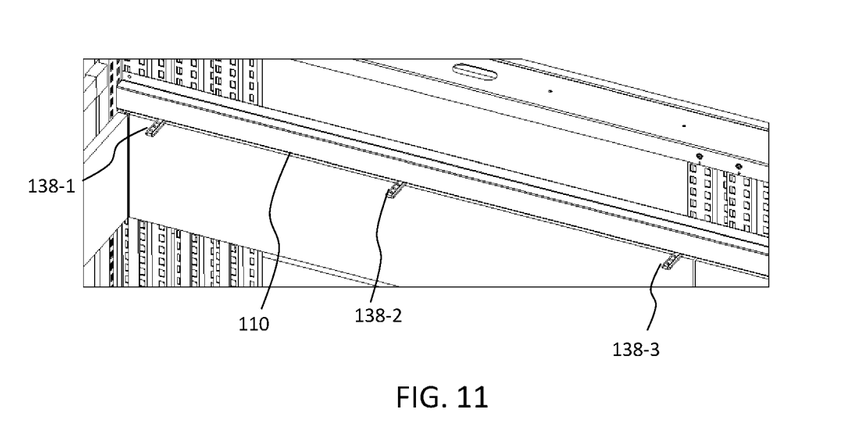
FIG. 11 illustrates cladding reveal spacers used between a top row of cladding and an unfastened ceiling mount assembly according to an example of the principles described herein.
Figure 12:
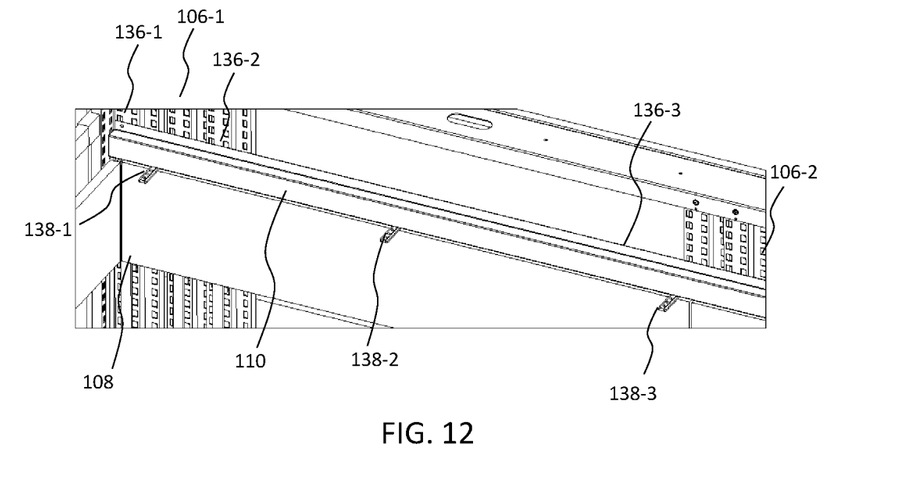
FIG. 12 illustrates cladding reveal spacers used between a top row of cladding and a fastened ceiling mount assembly according to an example of the principles described herein.

In FIG. 11, cladding reveal spacers 138-1, -2, -3 are shown inserted between the first side portion of the ceiling mount 110 and top edges of the top cladding 108 to achieve equal spacing reveals between the ceiling mount 110 and the top cladding 108. Cladding reveal spacers 138-1, -2, -3 include flat, resilient elongate members that provide a tight, non-slipping fit between the ceiling mount 110 and the top cladding 108. The ceiling mount 110 is attached to the studs 106-1, -2 after cladding reveal spacers 138-1, -2, -3 are inserted. In FIG. 12, wafer head screws 136-1, -2, -3 secure the ceiling mount 110 to the studs 106, -2, -3. After securing the ceiling mount 110 to studs 106-1, -2 with wafers 136-1, -2, -3, -4, the cladding reveal spacers 138-1, -2, -3 are then removed.

Figure 13:
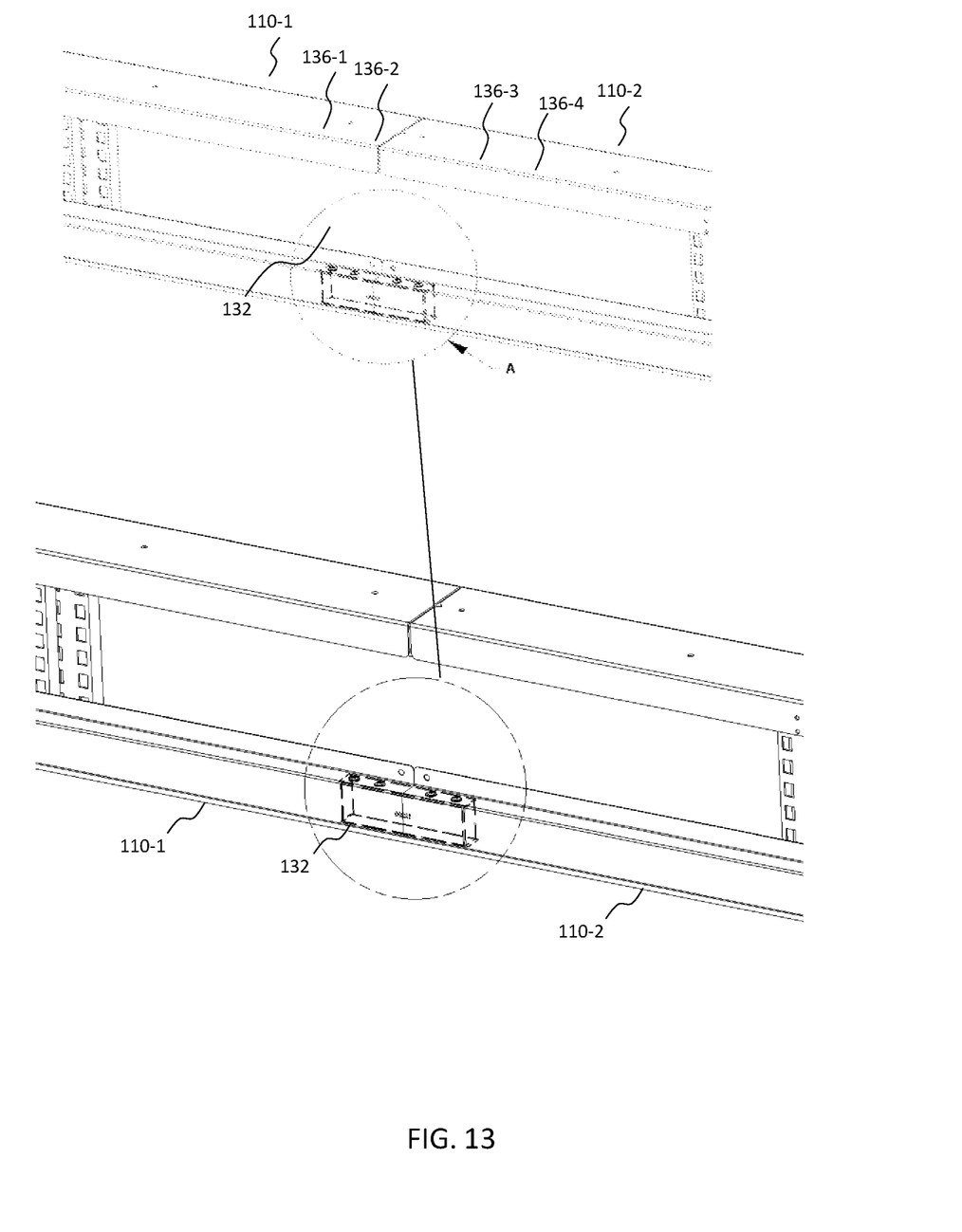
FIG. 13 illustrates a close-up view of a splice plate connecting two ceiling mounts according to an example of the principles described herein.

Ceiling mounts 110-1, -2 shown in FIG. 13 are secured together with ceiling splice plate 132. As shown in FIG. 13, ceiling splice plate 132 secures end portions of ceiling mounts 130-1, -2. Wafer head screws 136-1, -2, -3, -4 are used to secure the ceiling splice plate 132 to end portions of the ceiling mounts 130-1, -2.

The ceiling mounts 110-1, -2 being mounted below the top of the studs 106 allow for heat resistant properties which eliminates a need for having a fire-rated material above the ceiling level.

Note that the drop-in ceiling can be installed even after all the cladding is already installed.

Figure 14:
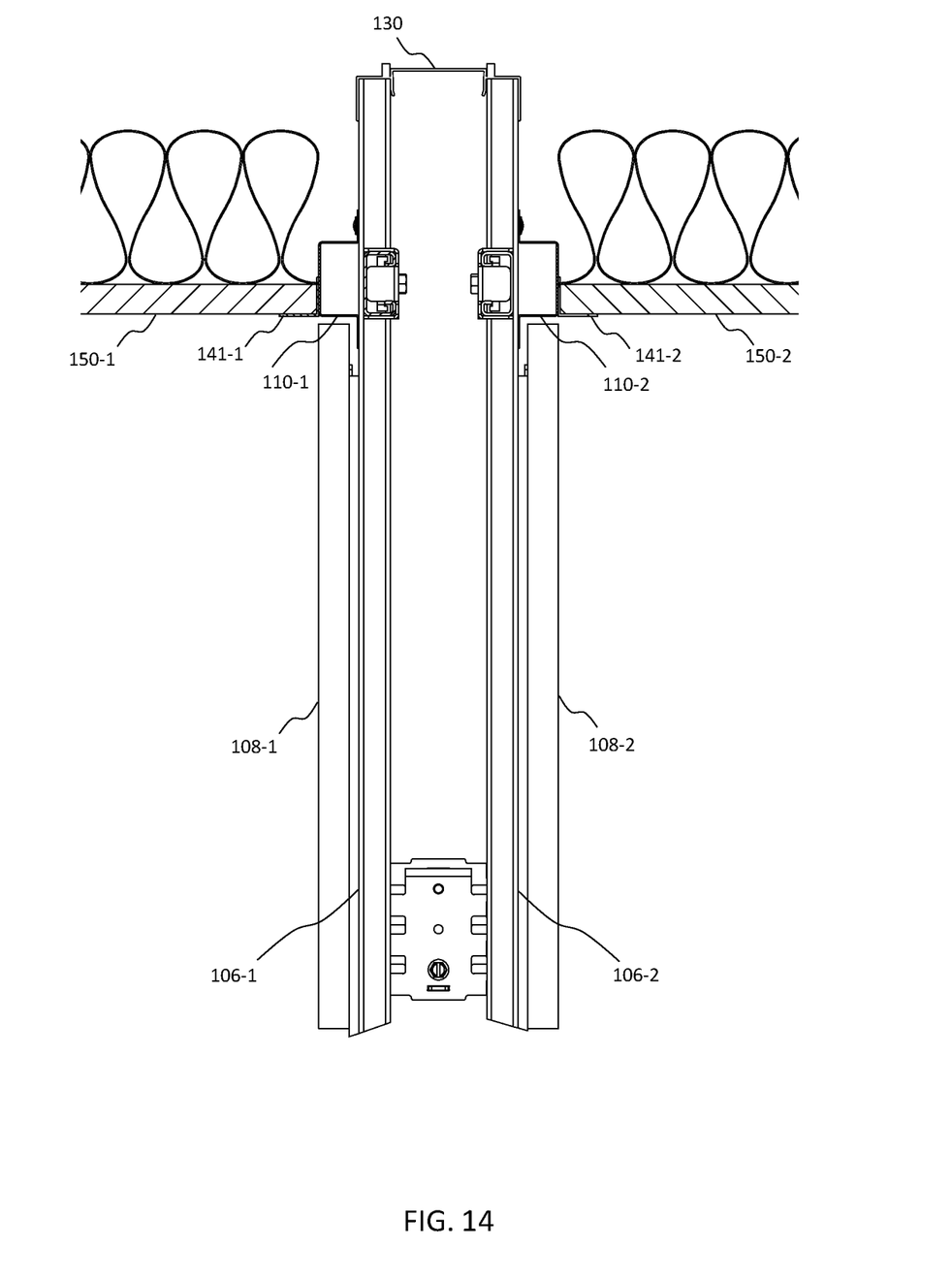
FIG. 14 illustrates a side cutout view of a cornice rail, ceiling mount, and studs according to an example of the principles described herein.

Turning to FIG. 14, a cutout view of a wall section of a wall system 100 is shown. Top cladding 108-1, 2 are attached to respective studs 106-1, -2. Ceiling mounts 110-1, -2 are attached above the top cladding 108-1, -2 to respective studs 106-1, -2. L-shaped molding 141-1, -2 is attached to respective ceiling mounts 110-1, -2 and used to support respective drop-in ceiling panels 150-1, -2. Cornice rail 130 is attached on top of studs 106-1, -2. Drop-in ceiling panels are secured to respective L-shape molding 141-1, -2. The drop-in ceiling panels may be lowered down to the L-shape molding 141-1, -2 after the L-shape molding 141-1, -2 is secured to the ceiling mounts 110-1, -2.

Figure 15:
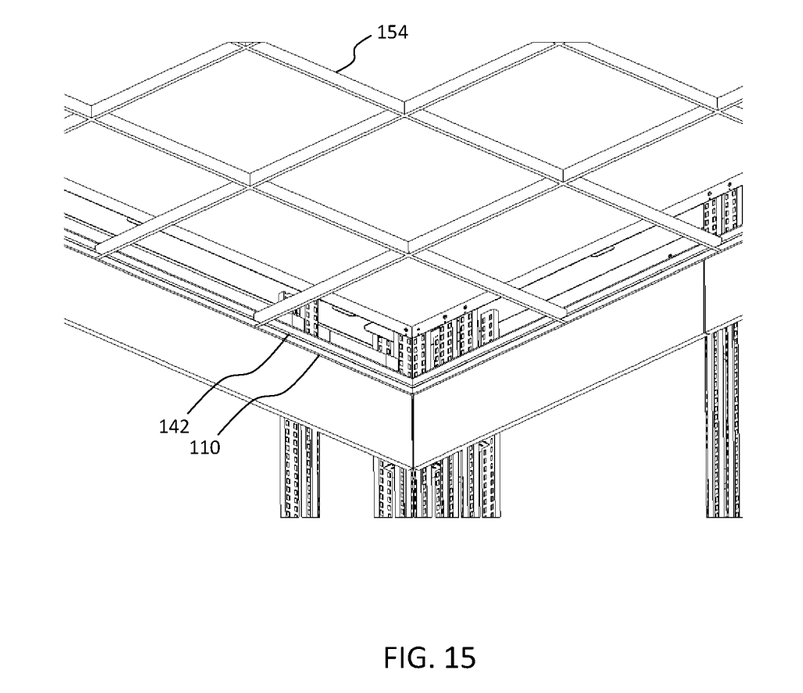
FIG. 15 illustrates an L-shaped molding on an unfinished ceiling according to an example of the principles described herein.

An example of L-shaped molding 142 that may be used on the perimeter as a ceiling starter as shown in FIG. 15. The L-molding 142 is attached to the ceiling mount 110 between segments of ceiling grid 154.

Figure 16:
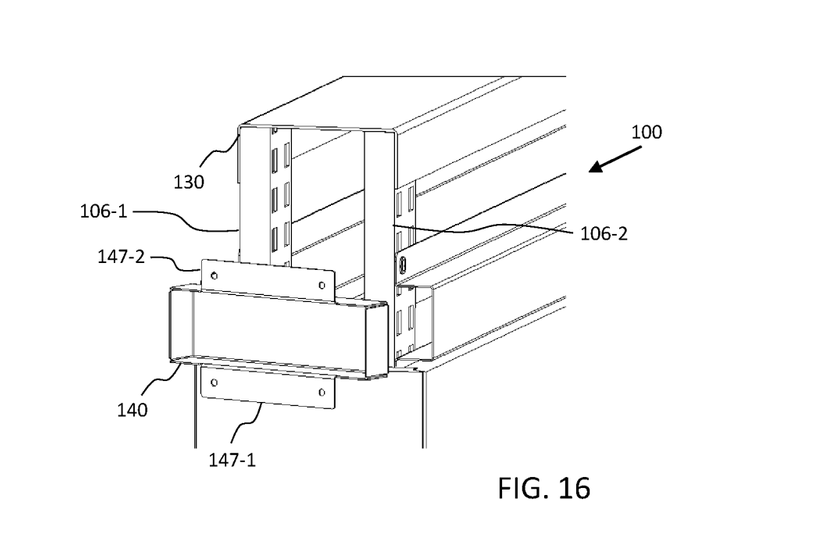
FIG. 16 illustrates a perspective view of an end cap according to an example of the principles described herein.
Figure 17:
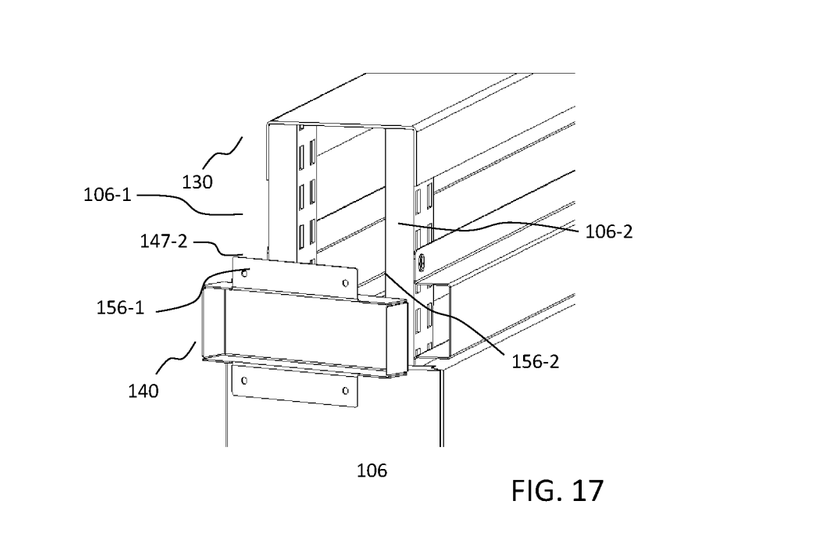
FIG. 17 illustrates a perspective view of an end cap attached to studs according to an example of the principles described herein.

Turning to FIGS. 16 and 17, end cap 140 is used to create a mounting rail at the end of wall 100. End portions 147-1, -2 are flat extensions that extend outward from the end cap 140. A first end portion 147-1 is inserted underneath cladding. End portion 147-2 is secured to the studs 106-1, -2 by wafer head screws 156-1, -2. Examples further include that wafer head screws be used on both end portions 147-1, -2 to secure the end cap 140 to studs 106-1, -2.

Figure 18:
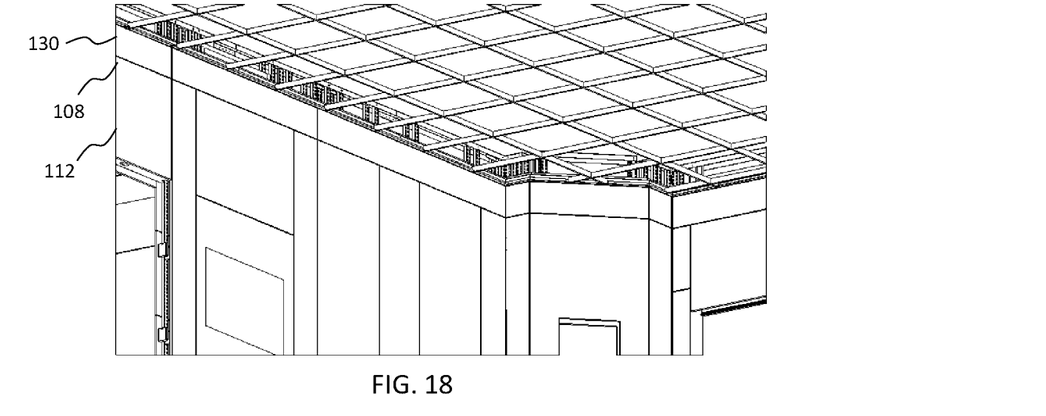
FIG. 18 illustrates the use of L-shaped molding on a perimeter of a ceiling starter according to an example of the principles described herein.
Figure 19:
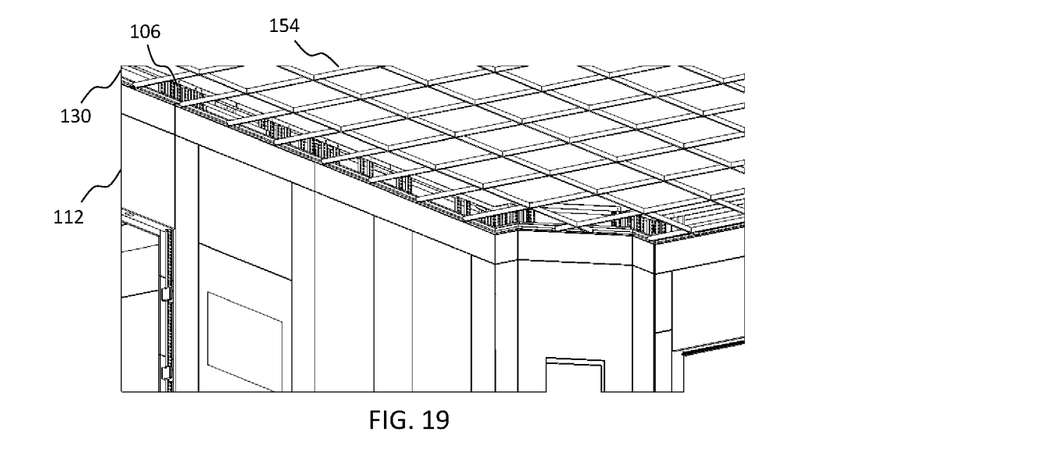
FIG. 19 illustrates secondary cladding and top cladding attached to studs according to an example of the principles described herein.
Figure 20:
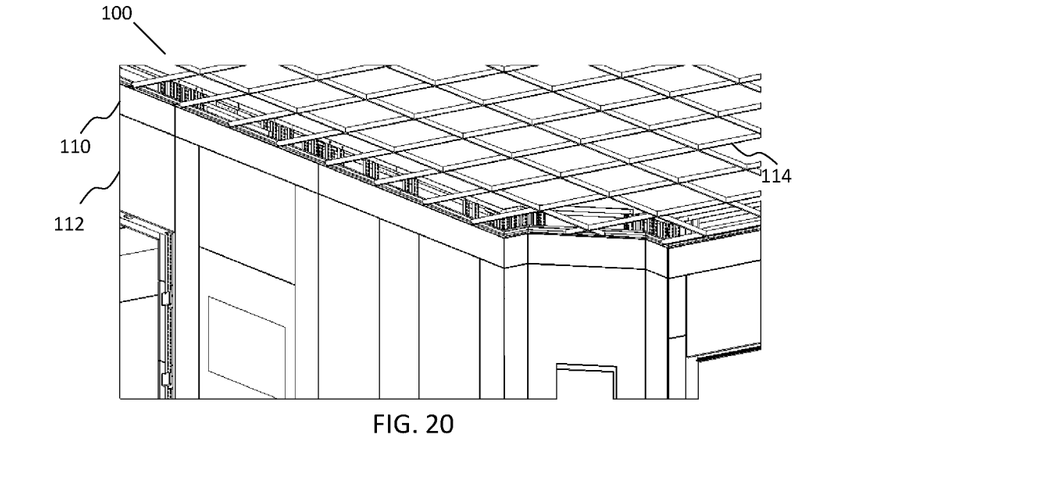
FIG. 20 illustrates a fully assembled drop-in ceiling wall system, according to an example of the principles described herein.

FIGS. 18, 19, and 20 illustrate the various steps of completing the drop-in ceiling after cornice rails, top cladding, and ceiling mounts are installed.

FIG. 18 illustrates top cladding 108, cornice rails 130, and secondary cladding 112 installed. Secondary cladding 112 is attached to the studs after the top cladding 108 and cornice rails 130 are installed.

In FIG. 19, the ceiling grid 154 is attached to the framework of studs 106. In an example, L-shaped molding 142 molding (see FIG. 15) is used to provide a structural skeletal frame for the ceiling.

FIG. 20 shows a fully completed wall system 100 with a drop-in ceiling 114 installed as a final step in assembling the drop-in ceiling wall system. As shown, the drop-in ceiling 114 includes ceiling panels that are attached to the L-shaped molding. Panels include edge ceiling panels that are attached at top edges of the ceiling mounts 110 according to an example of the principles described herein.

The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method for building a drop-in ceiling wall system, comprising:
    installing a floor track;
    installing a support structure of studs along the floor track;
    installing cornice rails to the studs;
    installing a top cladding to at least a portion of the studs;
    securing ceiling mounts to the studs;
    installing a secondary cladding;
    securing a drop-in ceiling on top of the ceiling mounts, the drop-in ceiling being below tops of the studs wherein installing studs comprises: using base foam and digital horizontals to space the studs around the floor track;
    inserting at least one of spacer blocks and foam blocks between at least two adjacent studs to define desired spacing between the at least two adjacent studs; and leveling studs to a benchmark height above a base floor as they are installed.

2. The method of claim 1, wherein installing the floor track comprises:
cutting a floor track to a desired length;
aligning the floor track with corresponding sight holes on a base floor; and
securing the floor track with anchors to the base floor.

3. The method of claim 1, wherein installing the floor track comprises:
abutting the floor track against a base building wall;
aligning the floor track with holes on the base building wall; and
securing the floor track with anchors to a base floor.

4. The method of claim 1, wherein installing support structure comprises:
installing at least one stud at a corner connection of the floor track; and
installing studs adjacent to the at least one stud along the floor track to define a skeletal frame wall around the floor track.

5. The method of claim 1, wherein leveling studs comprises:
setting a first stud above the floor at a set height, and
using the first stud as a reference to level remaining studs.

6. The method of claim 1, wherein securing cornice rails comprises:
placing cornice rails on top of the studs;
connecting ends of cornice rails together with splice plates; and
securing cornice rails to the studs after installing the top cladding to the studs.

7. The method of claim 6, wherein connecting ends of cornice rails comprises:
placing splice plates underneath adjacent edge portions of cornice rails, and
adjoining ends of the cornice rails together by securing the splice plates to undersides of the adjacent edge portions of the cornice rails.

8. The method of claim 6, wherein placing cornice rails comprises:
aligning cornice rails at predetermined indicated locations on top of the studs.

9. The method of claim 1, wherein securing the ceiling mounts comprises:
placing and securing splice plates within cavities of the ceiling mounts, and
connecting ends of the ceiling mounts together with the splice plates.

10. The method of claim 9, further comprising securing the splice plates to tops of the ceiling mounts with wafer head screws.

11. The method of claim 1, further comprising installing ceiling end caps at edges of the studs.

12. A system for building a solid wall with a drop-in ceiling, comprising:
a floor track;
a support structure of studs along the floor track;
ceiling mounts placed on the studs below tops of the studs;
a drop-in ceiling to be secured on top of the ceiling mounts,
cornice rails to be installed on the studs;
a top cladding to be installed on at least a portion of the studs; and
a secondary cladding to be installed on the studs wherein the ceiling mounts are secured to the studs above the top cladding.

13. The system of claim 12, further comprising at least one of the floor track, the studs, the cornice rails, the cladding, the ceiling mounts, the secondary cladding, and the drop-in ceiling being prepared before installation by cutting to a length based on at least one of the floor track or other pre-defined design measurement.

14. The system of claim 12, wherein the studs are leveled at least 5 inches above the floor track.

15. The system of claim 12, wherein the floor track is installed so that a portion of the floor track abuts against a base building wall.

16. The system of claim 12, further comprising an L-molding to be installed on the ceiling mount to be used as a ceiling starter.

17. The system of claim 12, wherein ceiling panels are to be installed underneath the cornice rails and on the ceiling mounts.

18. A drop-in ceiling wall system, comprising:
a floor track to be secured on a base floor;
a support structure of studs to be secured to the floor track;
cornice rails to be placed on top of the studs;
splice plates to connect ends of the cornice rails together;
a top cladding installed to at least a portion of the studs at a fixed distance below the top of the studs, the top cladding installed prior to the cornice rails being secured to the top of the studs;
ceiling mounts to be installed on top of the top cladding in a manner that provides equal spacing reveals between the ceiling mounts and the top cladding;
splice plates to connect ends of the ceiling mounts together;
a secondary cladding installed to the studs; and
a drop-in ceiling secured on top of the ceiling mounts.

* * * * *